(12) United States Patent
Maida et al.

(10) Patent No.: US 8,820,122 B2
(45) Date of Patent: Sep. 2, 2014

(54) TITANIA-DOPED QUARTZ GLASS AND MAKING METHOD

(75) Inventors: Shigeru Maida, Joetsu (JP); Hisatoshi Otsuka, Joetsu (JP); Osamu Sekizawa, Joetsu (JP); Naoki Yanagisawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/223,808

(22) Filed: Sep. 1, 2011

(65) Prior Publication Data

US 2012/0058419 A1 Mar. 8, 2012

(30) Foreign Application Priority Data

Sep. 2, 2010 (JP) ................................. 2010-196557

(51) Int. Cl.
*C03B 37/018* (2006.01)

(52) U.S. Cl.
USPC .............................................. 65/414; 65/416

(58) Field of Classification Search
USPC ........................................... 65/414–416, 377
See application file for complete search history.

(56) References Cited

U.S. PATENT DOCUMENTS

| | | | |
|---|---|---|---|
| 4,367,085 A * | 1/1983 | Suto et al. ........................ 65/415 |
| 4,797,143 A * | 1/1989 | Chida et al. ..................... 65/382 |
| 5,599,371 A * | 2/1997 | Cain et al. ........................ 65/413 |
| 5,788,730 A * | 8/1998 | Ruppert et al. ................. 65/17.4 |
| 6,334,339 B1 * | 1/2002 | Kanao et al. .................... 65/531 |
| 6,751,987 B1 * | 6/2004 | Ball et al. ....................... 65/17.4 |
| 7,053,017 B2 | 5/2006 | Hrdina et al. |
| 7,410,922 B2 | 8/2008 | Iwahashi et al. |
| 7,419,924 B2 | 9/2008 | Koike et al. |
| 7,462,574 B2 | 12/2008 | Iwahashi et al. |
| 7,981,824 B2 | 7/2011 | Englisch et al. |
| 8,105,734 B2 * | 1/2012 | Maida et al. ..................... 430/5 |
| 8,377,612 B2 * | 2/2013 | Maida et al. ..................... 430/5 |
| 2002/0148256 A1 | 10/2002 | Coriand et al. |
| 2003/0091308 A1 | 5/2003 | Uchiyama et al. |
| 2004/0182114 A1 | 9/2004 | Ooishi et al. |
| 2007/0042893 A1 | 2/2007 | Koike et al. |
| 2007/0134566 A1 | 6/2007 | Maida et al. |
| 2010/0003609 A1 * | 1/2010 | Maida et al. ..................... 430/5 |
| 2012/0258389 A1 * | 10/2012 | Maida et al. ..................... 430/5 |

FOREIGN PATENT DOCUMENTS

| | | | |
|---|---|---|---|
| JP | 59-174535 A | 10/1984 | |
| JP | 2003226544 A * | 8/2003 | ............ C03B 37/018 |
| JP | 2004-315351 A | 11/2004 | |
| JP | 2005-022954 A | 1/2005 | |

(Continued)

OTHER PUBLICATIONS

English Language Translation of JP 59-174535.*

(Continued)

*Primary Examiner* — Jason L Lazorcik
(74) *Attorney, Agent, or Firm* — Westerman, Hattori, Daniels & Adrian, LLP

(57) ABSTRACT

A titania-doped quartz glass suited as an EUV lithographic member is prepared by feeding a silicon-providing reactant gas and a titanium-providing reactant gas through a burner along with hydrogen and oxygen, subjecting the reactant gases to oxidation or flame hydrolysis to form synthetic silica-titania fine particles, depositing the particles on a rotating target, and concurrently melting and vitrifying the deposited particles to grow an ingot of titania-doped quartz glass. The target is retracted such that the growth front of the ingot may be spaced a distance of at least 250 mm from the burner tip.

10 Claims, 3 Drawing Sheets

(56) References Cited

FOREIGN PATENT DOCUMENTS

| JP | 2008-182220 A | 8/2008 |
|---|---|---|
| WO | 03-077038 A2 | 9/2003 |
| WO | 2005-114328 A2 | 12/2005 |
| WO | 2006-004169 A1 | 1/2006 |

OTHER PUBLICATIONS

English Language Machine Translation of JP 2003-226544A (Accessed http://www4.ipdl.inpit.go.jp/Tokujitu/PAJdetail.idpl?N0000=60&N0120=01&N2001-32 2&N3001=2003-226544 on Oct. 25, 2013).*
Saito, JP 2003-226544—English Langauge translation.*
European Search Report dated Dec. 1, 2011, issued in corresponding European Patent Application No. 11179625.6.
Anand Agarwal et al., "A simple IR spectroscopic method for determining fictive temperature of silica glasses", Journal of Non-Crystalline Solids 185, 1995; pp. 191-198.
Zhurnal P. Spektroskopii et al.,"Determining The Content of Hydrogen Dissolved in Quartz Glass Using the Methods of Raman Scattering and Mass Spectrometry"; vol. 46, No. 6, pp. 981-991; Jun. 1987. With partial English translation.

* cited by examiner

TITANIA-DOPED QUARTZ GLASS AND MAKING METHOD

CROSS-REFERENCE TO RELATED APPLICATION

This non-provisional application claims priority under 35 U.S.C. §119(a) on Patent Application No. 2010-196557 filed in Japan on Sep. 2, 2010, the entire contents of which are hereby incorporated by reference.

TECHNICAL FIELD

This invention relates to titania-doped quartz glass suited for use in the EUV lithography, and a method for manufacturing the same.

BACKGROUND ART

In the advanced lithography process for the fabrication of semiconductor devices, a light source of shorter wavelength is used for exposure. A subsequent transition to lithography using extreme ultraviolet (EUV) is regarded promising. Since the EUV lithography uses a reflecting optical system, the lithography accuracy can be adversely affected even by a slight thermal expansion of each member (e.g., substrate) in the lithographic optical system induced by the heat that has reached there. Accordingly, members like reflecting mirrors, masks, and stages must be made of low expansion materials. Titania-doped quartz glass is known as a typical low expansion material. The addition of a certain amount of titania makes it possible to minimize the thermal expansion of quartz glass.

The EUV lithography members must also have a uniform distribution of low thermal expansion. To gain a uniform distribution of low thermal expansion, it is of the first priority that quartz glass be doped with titania in a uniform concentration. For example, JP-A 2004-315351 discloses titania-doped quartz glass in which a difference between maximum and minimum $TiO_2$ concentrations is less than or equal to 0.06% by weight in a range of 30 mm×30 mm, and a variation ($\Delta n$) of refractive index which varies with the $TiO_2$ concentration in quartz glass is less than or equal to $2\times10^{-4}$ in a range of 30 mm×30 mm.

Also an OH group concentration in titania-doped quartz glass is known as one of the physical properties having impact on the low thermal expansion of titania-doped quartz glass. For example, WO 2005/114328 discloses a quartz glass blank having a mean OH content of 700 to 1,000 wt ppm, wherein a variation of OH content, averaged over a thickness of the quartz glass blank, does not exceed ±50 ppm in an area of the main functional direction. Then the optical and thermal properties of quartz glass are kept as homogeneous as possible.

JP-A 2005-022954 describes that the fictive temperature of glass is correlated to the extent of a zero expansion temperature range that is a temperature range in which the coefficient of thermal expansion (CTE) of glass becomes virtually zero (0). For the purpose of broadening the zero expansion temperature range, the fictive temperature is preferably up to 950° C., more preferably up to 900° C., and even more preferably up to 850° C. Since a high OH group concentration in glass indicates fast structural relaxation, the manufacture of a glass block having a large diameter enough to invite a temperature distribution tends to entail a fictive temperature distribution. Thus the OH group concentration is preferably up to 600 ppm, more preferably up to 400 ppm, and even more preferably up to 200 ppm. In addition, if the OH group concentration varies over a wide range, the structural relaxation time may substantially vary at different positions, inviting a difference in fictive temperature. Thus the variation of the OH group concentration in titania-doped quartz glass is preferably within 50 ppm, more preferably within 30 ppm, and even more preferably within 10 ppm.

As discussed above, the OH group concentration in titania-doped quartz glass has a significant impact on low thermal expansion. It is thus believed important to specify the absolute amount and distribution of OH group concentration in titania-doped quartz glass.

WO 2005/114328 also refers to birefringence. In the preferred embodiment, the maximum stress birefringence (SDB) at 633 nm perpendicular to the main functional direction (or cylinder axis) does not exceed 5 nm/cm, and a substantial portion of the maximum stress birefringence has a gradient that does not exceed 50 (nm/cm)/cm.

JP-A 2008-182220 describes a peak-to-valley striae level or RMS striae level of a glass material computed from a retardation proportional to the amount of stress in the material. It is necessary to reduce the peak-to-valley striae level or RMS striae level since the striae level has an adverse impact on the light transmission of lens or window elements made of glass.

WO 2006/004169 discloses a $TiO_2$-containing silica glass wherein an internal transmittance per 1 mm thickness in a wavelength range of 400 to 700 nm is at least 70% and an internal transmittance per 1 mm thickness in a wavelength range of 300 to 3,000 nm is at least 70%. If the internal transmittance is less than 70%, there may be inconvenience in inspection or evaluation such that an inspection to control homogeneity or surface smoothness by a measuring equipment using a laser interferometer is less likely to be easily carried out. Further, in a case of a component to let visible light or infrared light pass therethrough, the transmitted light intensity decreases.

As discussed above, the low expansion materials, typically for use as EUV lithography optical members, must meet numerous physical property values in order that the material have low thermal expansion and surface smoothness.

When quartz glass is used as EUV lithography members, the glass must meet the uniformity of low thermal expansion. Factors that have an impact on the uniformity of low thermal expansion of titania-doped quartz glass include a titania dopant concentration, impurity concentration, fictive temperature and the like. It is possible to achieve the uniformity of low thermal expansion of the overall glass by offsetting these factors or by rendering each of these factors uniform.

CITATION LIST

Patent Document 1: JP-A 2004-315351
Patent Document 2: WO 2005/114328 (JP-A 2008-505827)
Patent Document 3: JP-A 2005-022954
Patent Document 4: JP-A 2008-182220 (U.S. Pat. No. 7,053,017)
Patent Document 5: WO 2006/004169 (JP-A 2008-505043)

DISCLOSURE OF INVENTION

Continuing a study on a titania-doped quartz glass for EUV lithography optical members, the inventors found that quartz glass having a $TiO_2$ concentration, refractive index, OH group concentration, birefringence, and internal transmittance in 300-3,000 nm range adjusted to their specific ranges is still insufficient as the EUV lithography optical member. Particularly when the absorption edge wavelength is not uniform and has a distribution, the quartz glass tends to undergo thermal hysteresis during service as the EUV lithography member.

Therefore, an object of the invention is to provide a titania-doped quartz glass having a minimal distribution of absorption edge wavelength at an apparent transmittance per 5-mm thickness and suited for use as EUV lithography members, and a method for preparing the same.

In one aspect, the invention provides a method for preparing a titania-doped quartz glass, comprising the steps of feeding a silicon-providing reactant gas and a titanium-providing reactant gas through a burner tip along with a combustible gas and a combustion-supporting gas, subjecting the reactant gases to oxidation or flame hydrolysis to form synthetic silica-titania fine particles, depositing the silica-titania fine particles on a rotating target, and concurrently melting and vitrifying the deposited particles to grow an ingot of titania-doped quartz glass. The method further comprises the step of retracting the target at such a rate that the distance between the burner tip and the growth front of the ingot may be at least 250 mm.

In a preferred embodiment, the ingot growing on the target has a growth axis, the burner includes a central tube for feeding the reactant gases having a nozzle axis, and the burner is oriented relative to the target such that the angle included between the growth axis and the nozzle axis is at least 126 degrees.

In a preferred embodiment, the burner comprises a central multi-fold tube section including a central tube for feeding the reactant gases, and a multi-nozzle section enclosing the central multi-fold tube section. Oxygen gas as the combustion-supporting gas and hydrogen gas as the combustible gas are fed through the burner such that oxygen in excess of the stoichiometry is available in at least one of the multi-nozzle section and the central multi-fold tube section.

Also preferably, the feeding step includes injecting hydrogen gas as the combustible gas through the burner at a linear velocity of up to 100 m/sec and injecting the reactant gases at a linear velocity of at least 30 m/sec.

Further preferably, in the step of feeding the silicon-providing reactant gas, titanium-providing reactant gas, combustible gas, and combustion-supporting gas at respective flow rates, the flow rate of each gas is controlled within a variation of ±1% by volume.

In another aspect, the invention provides a titania-doped quartz glass having an absorption edge wavelength at an apparent transmittance per 5-mm thickness, a distribution of the absorption edge wavelength being less than or equal to 10 nm.

In a preferred embodiment, the absorption edge wavelength at an apparent transmittance per 5-mm thickness is longer than or equal to 270 nm. In a preferred embodiment, the apparent transmittance per 5-mm thickness is more than or equal to 70% at a wavelength of 350 to 800 nm. In a preferred embodiment, the total content of metal impurities excluding titanium is less than or equal to 100 ppb. In preferred embodiments, the titania-doped quartz glass has a hydrogen molecule concentration of less than or equal to $5 \times 10^{17}$ molecules/cm$^3$; contains 3 to 10% by weight of titania; has a fictive temperature of lower than or equal to 925° C.; and/or has a fictive temperature distribution of less than or equal to 50° C.

Also provided is an EUV lithographic member comprising the titania-doped quartz glass defined above. The member is typically an EUV lithographic photomask substrate.

Advantageous Effects of Invention

One embodiment of the invention is a titania-doped quartz glass having a minimal distribution of absorption edge wavelength at an apparent transmittance per 5-mm thickness, which is best suited for use as EUV lithography members.

DESCRIPTION OF EMBODIMENTS

Figure 1:
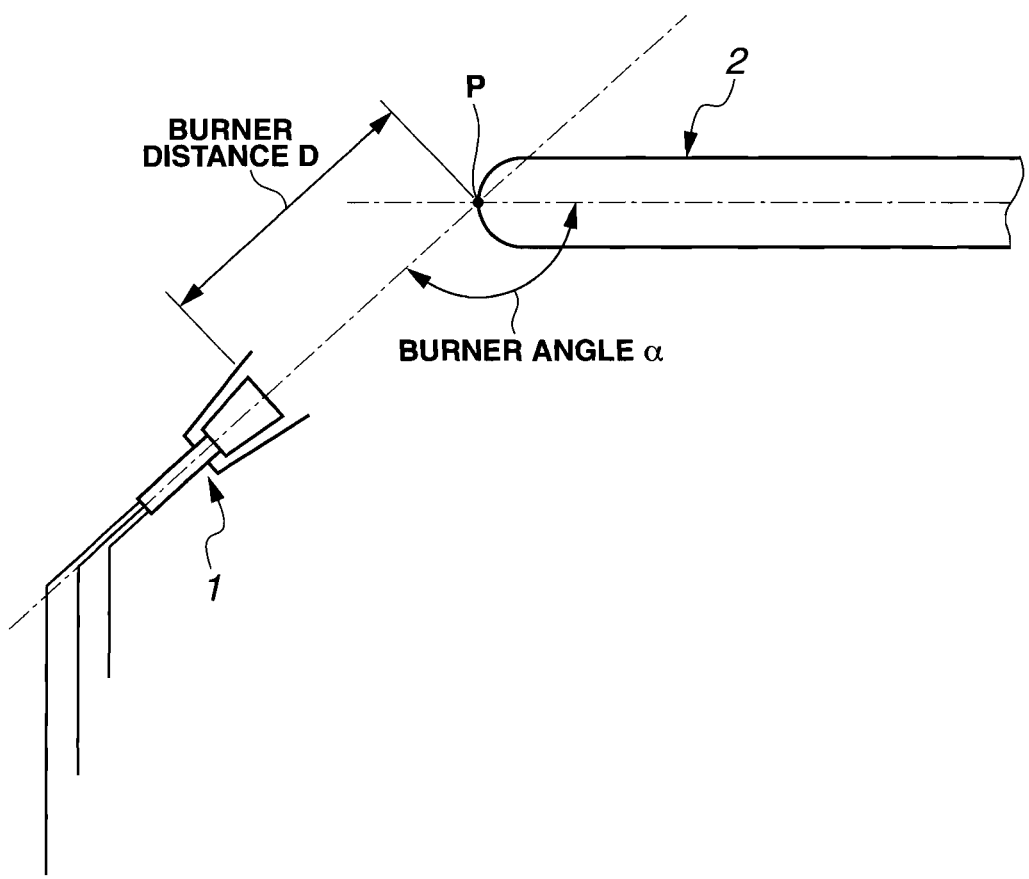
FIG. 1 is a side view of a burner, showing its angle and distance relative to a target.

Titania-doped quartz glass has an absorption edge in the ultraviolet spectrum. It is probably assigned to the band gap between the upper end of valence band given by the 2p orbit of oxygen and the lower end of conduction band given by the 3d orbit of titanium. For this reason, titania-doped quartz glass should have a certain absorption edge wavelength. However, actual titania-doped quartz glass contains many various structural defects generated during preparation, heat treatment or mechanical processing, and fluctuations in bond angle and bond distance of elements due to the glass own nature, and as a result, the absorption edge wavelength varies.

The structural defects which cause the absorption edge wavelength to change are indefinite. For example, the presence of structural defects such as ≡M-O—O-M≡, ≡M-M≡, and =M: (wherein M is silicon or titanium) in titania-doped quartz glass is believed to be one cause. While fictive temperature is generally used as a measure indicative of the structural stability of quartz glass, it is difficult to express these structural defects in terms of fictive temperature.

If titania-doped quartz glass having a substantial distribution of absorption edge wavelength is used as an optical member in the EUV lithography, it tends to undergo thermal hysteresis by thermal cycling (iteration of rise and fall of the member temperature upon exposure to EUV light and interruption of exposure). As a result, titania-doped quartz glass having a substantial distribution of absorption edge wavelength is rather unsuitable as the EUV lithography member.

So far, little attention is paid to the thermal hysteresis since it will take some more time until the EUV lithography can be applied in a commercially acceptable manner. However, changes in geometry and physical properties of a member owing to thermal hysteresis are considered detrimental to the practical application of the EUV lithography. It is thus necessary to control thermal hysteresis.

According to the invention, the titania-doped quartz glass has an absorption edge wavelength at an apparent transmittance per 5-mm thickness, and a distribution of absorption edge wavelength is less than or equal to 10 nm, preferably less than or equal to 5 nm, and more preferably less than or equal to 3 nm. The lower limit of the distribution of absorption edge wavelength at an apparent transmittance per 5-mm thickness is typically at least 0.001 nm, more preferably at least 0.01 nm, though not critical.

In the preferred embodiment of the titania-doped quartz glass, the absorption edge wavelength at an apparent transmittance per 5-mm thickness is longer than or equal to 270 nm, more preferably longer than or equal to 275 nm, and even more preferably longer than or equal to 277 nm. If the absorption edge wavelength at an apparent transmittance per 5-mm thickness is shorter than 270 nm, then a low thermal expansion necessary as the EUV lithography member may be least available. In the preferred embodiment of the titania-doped quartz glass, the absorption edge wavelength at an apparent transmittance per 5-mm thickness is shorter than or equal to 320 nm, more preferably shorter than or equal to 300 nm, even more preferably shorter than or equal to 290 nm, and most preferably shorter than or equal to 285 nm. If the absorption edge wavelength at an apparent transmittance per 5-mm thickness is longer than 320 nm, then too much titania fine grains may form in titania-doped quartz glass.

In another preferred embodiment of the titania-doped quartz glass, the apparent transmittance per 5-mm thickness at a wavelength of 350 to 800 nm is at least 70%, more preferably at least 80%, and even more preferably at least 90%. If the apparent transmittance per 5-mm thickness at a wavelength of 350 to 800 nm is less than 70%, such a low transmittance may interfere with alignment and quality inspection of the member, which is inadequate for the EUV lithography member requiring accurate alignment and inspection. A drop of transmittance in the visible range due to the presence of reducing species in titania-doped quartz glass also has an impact on the absorption edge wavelength. The upper limit of the apparent transmittance per 5-mm thickness at a wavelength of 350 to 800 nm is not critical, but is typically up to 95% when a loss of transmittance due to surface reflection is taken into account.

As used herein, the term "absorption edge wavelength" refers to an average wavelength which is determined by providing a titania-doped quartz glass sample of 5 mm thick which has been precision polished and cleaned on both surfaces, measuring 5 times an apparent transmittance of the glass sample in the visible-UV spectrum, and averaging the wavelengths at which the apparent transmittance is less than or equal to 1%. Transmittance measurement is performed by a transmittance meter, specifically VARIAN Cary 400 UV-Vis spectrophotometer, under the following conditions.

Light source: heavy hydrogen lamp
Averaging time: 1.0 sec
Data interval: 0.083 nm
Scan rate: 4.98 nm/min
SBW: 3.0 nm
Measurement wavelength range: 330-260 nm It is noted that when the apparent transmittance at a wavelength of 350 to 800 nm is measured, measurement is performed under the same conditions as above aside from changing the measurement wavelength range to 350 to 800 nm.

The sample for apparent transmittance measurement is provided by lapping a quartz glass sample on a double-side lapping machine Model 12B (Fujikoshi Machinery Corp.) with a suede-type lapping pad and a cerium oxide abrasive slurry until the thickness of the sample reaches 5 mm±20 µm. This is followed by lapping for a further 1 hour with colloidal silica as the lapping slurry, and cleaning.

In a preferred embodiment of the titania-doped quartz glass, the total content of metal impurities excluding titanium is up to 100 ppb, more preferably up to 50 ppb, and even more preferably up to 25 ppb. If more metal impurities are contained in the member, they become defects upon exposure to EUV radiation, causing a geometrical change and temperature rise to the member. They also cause poisoning in the semiconductor manufacture process. The lower limit of the total content of metal impurities excluding titanium is typically at least 0.1 ppb, though not critical. The content of metal impurities is measured by dissolving titania-doped quartz glass in hydrofluoric acid and analyzing the solution on an ICP-MS analyzer.

The titania-doped quartz glass should preferably have a hydrogen molecule concentration of less than or equal to $5 \times 10^{17}$ molecules/cm$^3$, more preferably less than or equal to $1 \times 10^{17}$ molecules/cm$^3$. Even more preferably, in Raman spectroscopy, the peak near 4,135 cm$^{-1}$ assigned to hydrogen molecule is below the detection limit. Since titania-doped quartz glass containing more hydrogen molecules tends to generate unwanted inclusions such as bubbles when hot shaped into the desired shape, it is preferred that the concentration of hydrogen molecules be as low as possible.

It is noted that the hydrogen molecule concentration is measured by a Raman spectrometer NRS-2100 by Jasco Corp. using a 4-W argon ion laser as the exciting light source and according to the method described in Zurnal Pril; adnoi Spektroskopii Vol. 46, No. 6, pp 987-991, June 1987. The detection limit is $7.5 \times 10^{16}$ molecules/cm$^3$.

The titania-doped quartz glass should preferably have a titania content of 3 to 10% by weight, more preferably 5 to 9% by weight, even more preferably 6.7 to 7.7% by weight, and most preferably 6.8 to 7.3% by weight, in order that the glass undergo low thermal expansion in the exposure temperature range of the EUV lithography. The titania content is measured by electron probe microanalysis (EPMA) using a probe with a diameter of 10 µm. Computation is made on the assumption that all titanium detected is present as titania ($TiO_2$). The titania content is also important in setting the absorption edge wavelength at an apparent transmittance per 5-mm thickness to the range of 270 to 320 nm.

In a preferred embodiment, the titania-doped quartz glass has a coefficient of thermal expansion (CTE) which becomes zero (0) at a temperature within the temperature range of 0° C. to 100° C., more preferably within the temperature range of 10° C. to 80° C., even more preferably within the temperature range of 20° C. to 60° C., further preferably within the temperature range of 20° C. to 50° C., and most preferably within the temperature range of 20° C. to 40° C. It is noted that the CTE and the thermal expansion curve may be determined on a sample sized 6 mm diameter and 12 mm length and having mirror polished ends of cannonball shape by a thermal dilatometer LIX-2 by Ulvac-Riko, Inc.

It is noted that the temperature at which the CTE becomes 0 may be adjusted to the desired level by controlling the titania content and the fictive temperature. For example, the temperature at which the CTE becomes 0 may be set near 30° C. by controlling the titania content to 6.8 to 7.3 wt % and the fictive temperature to or below 850° C.

The titania-doped quartz glass should preferably have a fictive temperature of lower than or equal to 925° C., more preferably lower than or equal to 850° C., even more preferably lower than or equal to 800° C., and most preferably lower than or equal to 775° C. The lower limit of the fictive temperature is typically at least 500° C., though not critical. Since the CTE of titania-doped quartz glass depends on the distribution of fictive temperature, it preferably has a fictive temperature distribution (∆FT) of less than or equal to 50° C., more preferably less than or equal to 25° C., even more preferably less than or equal to 20° C., and most preferably less than or equal to 15° C. The lower limit of the fictive temperature distribution is typically at least 0.1° C., though not critical. It is noted that the fictive temperature of titania-doped quartz glass may be measured by the method described in J. Non-Cryst. Solids, 185, 191 (1995).

Titania-doped quartz glass may change its OH group concentration upon heat treatment at 900° C. for 100 hours (simply referred to as "900° C./100-hr heat treatment," hereinafter). The titania-doped quartz glass should desirably experience a reduction in OH group concentration of less than or equal to 100 ppm upon 900° C./100-hr heat treatment. The reduction of OH group concentration is more preferably less than or equal to 50 ppm, and even more preferably less than or equal to 20 ppm. Most preferably the reduction of OH group concentration is substantially nil, that is, within the measurement error range before and after the 900° C./100-hr heat treatment. If titania-doped quartz glass experiences a greater change in OH group concentration upon 900° C./100-hr heat treatment, then the glass has a broader OH group concentration distribution, and it eventually experiences substantial changes of thermal properties because its fictive temperature and birefringence are affected at the same time.

In a preferred embodiment of titania-doped quartz glass, the difference between maximum and minimum reductions of OH group concentration upon the 900° C./100-hr heat treatment is less than or equal to 50 ppm, more preferably less than or equal to 20 ppm, and most preferably substantially nil. If a substantial difference is found in the reduction of OH group concentration upon the 900° C./100-hr heat treatment, the glass has a distribution of thermal properties and is inadequate as the EUV lithography member.

The titania-doped quartz glass should preferably have an OH group concentration of from 300 ppm to 950 ppm, more preferably from 400 ppm to 850 ppm, even more preferably more than 500 ppm and less than 750 ppm, and most preferably more than 500 ppm and less than 700 ppm, after the 900° C./100-hr heat treatment. If the OH group concentration is less than 300 ppm, an absorption band is often observed on measurement of the transmittance in the visible region of titania-doped quartz glass. If the OH group concentration is more than 950 ppm, titania-doped quartz glass tends to generate unwanted inclusions such as bubbles when hot shaped into the desired shape.

An OH group concentration of titania-doped quartz glass is measured by an infrared spectrophotometer FT/IR-300E by Jasco Corp. Specifically, a glass sample was scanned over a range of 3,000 to 5,000 cm$^{-1}$ at a speed of 2 cm$^{-1}$ and an accumulation count of 20, obtaining an absorption spectrum. A straight line connecting peaks at 4,762 cm$^{-1}$ and 4,202 cm$^{-1}$ is used as the baseline. An absorption coefficient is given by the peak height near 4,522 cm$^{-1}$. The OH group concentration is computed in accordance with the equation:

OH group concentration (ppm)=(absorption coefficient at 4522 cm$^{-1}$)/$T$×4400 wherein T is a thickness (cm) of the sample.

In a test, measurement was repeated 5 times at the same position on the glass sample, with a measurement value being an average of 5 measured values. A measurement value of OH group concentration varied in a range of ±2 ppm at the same measurement position. When measurement values at the same position of the same sample were in a range of ±2 ppm before and after the 900° C./100-hr heat treatment, the difference between maximum and minimum reductions of OH group concentration was regarded substantially nil.

The titania-doped quartz glass is suited as a stock for forming EUV lithography members such as EUV lithography photomask substrates and reflecting optical system mirrors in EUV lithography apparatus. It is best suited as EUV lithography photomask substrates and reflecting optical system mirrors in EUV lithography apparatus since it enables transfer of a pattern of high image quality and fine size onto a wafer.

In the case of titania-free pure quartz glass for the KrF or ArF excimer laser lithography, many known research works discuss how to control the generation of structural defects causing a change of absorption edge wavelength. If a similar method is applied to titania-doped quartz glass, however, it is impossible to control the generation of structural defects. A unique method must be adopted, and parameters during preparation of titania-doped quartz glass must be appropriately controlled.

According to the invention, titania-doped quartz glass may be prepared by feeding a combustible gas containing hydrogen and a combustion-supporting gas containing oxygen to a burner built in a quartz glass-manufacturing furnace, burning the gases to form an oxyhydrogen flame at the burner tip, feeding a silicon-providing reactant gas and a titanium-providing reactant gas through the burner into the flame for subjecting the reactant gases to oxidation or flame hydrolysis to thereby form silica, titania and composite fine particles, depositing the fine particles on a rotating target disposed forward of the burner, and concurrently melting and vitrifying the deposited particles to grow titania-doped quartz glass to form an ingot, hot shaping the ingot into a predetermined shape, and annealing the shaped ingot. In a preferred embodiment, the flow rates of the combustible gas, the combustion-supporting gas, the silicon-providing reactant gas and the titanium-providing reactant gas are controlled so that respective variations of the flow rates may fall within ±1% by volume, the temperatures of cooling air flowing into the furnace, exhaust gas from the furnace, and ambient air surrounding the furnace are controlled so that respective variations of the temperatures may fall within ±2.5° C., and the target is rotated at a rotational speed of at least 5 rpm when the silica-titania fine particles are deposited on the rotating target.

The quartz glass-manufacturing furnace may be of vertical or horizontal type. The target of a seed or similar material is typically rotated at a rotational speed of at least 5 rpm, preferably at least 15 rpm, and more preferably at least 30 rpm. This is because striae, strains or structurally or compositionally non-uniform zones generate, depending largely on the unevenness of temperature in a portion where titania-doped quartz glass grows on the rotating target. Then the generation of structurally or compositionally non-uniform zones in titania-doped quartz glass can be inhibited by increasing the rotational speed of the target so that an even temperature may be available in a portion where titania-doped quartz glass grows. The upper limit of rotational speed of the target is typically 200 rpm.

The generation of structurally or compositionally non-uniform zones in titania-doped quartz glass can be inhibited by supplying the silicon-providing reactant gas and the titanium-providing reactant gas through a common nozzle of the burner along with the combustion-supporting gas. To this end, the silicon-providing reactant gas, titanium-providing reactant gas, and combustion-supporting gas are preferably premixed and made uniform in composition through a line mixer or the like.

The burner used in the preparation of titania-doped quartz glass preferably comprises a central multi-fold tube section and a multi-nozzle section. The central multi-fold tube section includes a reactant gas injecting nozzle at the center and a plurality of concentrically arranged nozzles. The plurality of nozzles receive combustion-supporting gas or combustible gas. On the other hand, the multi-nozzle section includes small-diameter nozzles arranged in rows concentric with respect to the central reactant gas injecting nozzle for injecting combustion-supporting gas and a space outside the small-diameter nozzles for injecting combustible gas.

Figure 2:
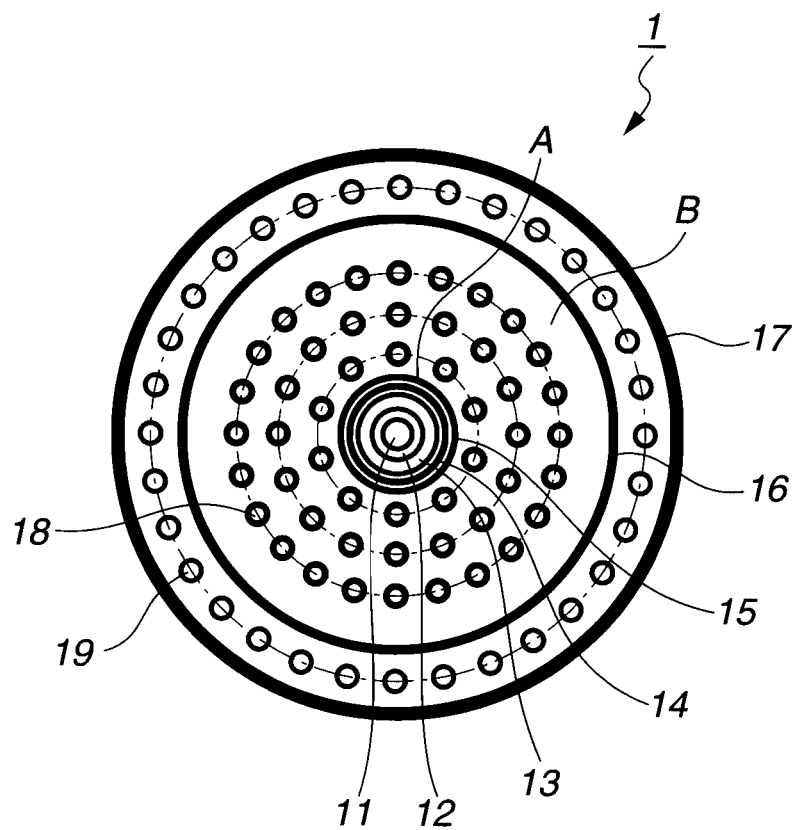
FIG. 2 is a radial cross-sectional view of a gas injection outlet of a burner for the manufacture of titania-doped quartz glass used in Examples.

Specifically, the burner is preferably of the structure shown in FIG. 2. The burner 1 is illustrated in FIG. 2 as comprising a central multi-fold tube section A at the center and a multi-nozzle section B enclosing section A. The central multi-fold tube section A includes a central tube (or nozzle) 11 for injecting reactant gases, a first combustion-supporting gas feed tube 12 enclosing the central tube 11, a first combustible gas feed tube 13 enclosing the tube 12, a second combustion-supporting gas feed tube 14 enclosing the tube 13, and a second combustible gas feed tube 15 enclosing the tube 14, in a concentric telescopic arrangement. The multi-nozzle section B includes a first shell 16 disposed outside and enclosing the second combustible gas feed tube 15, and a second shell 17 disposed outside and enclosing the first shell 16. A multiplicity of third combustion-supporting gas feed tubes 18 are disposed between the second combustible gas feed tube 15 and the first shell 16, in three rows concentric with the central tube 11 while combustible gas is fed through the remaining space within the first shell 16 (outside third combustion-supporting gas feed tubes 18). A multiplicity of fourth combustion-supporting gas feed tubes 19 are disposed between the first and second shells 16 and 17 in a concentric row while combustible gas is fed through the remaining space within the second shell 17 (outside fourth combustion-supporting gas feed tubes 19).

In the preparation of titania-doped quartz glass according to the invention, the central multi-fold tube section A of the burner preferably includes at least three tubes, and more preferably at least five tubes. A burner having a central multi-fold tube section consisting of less than three tubes tends to produce a broader distribution of absorption edge wavelength. The number of shells is not limited to the illustrated embodiment, and a single shell is acceptable.

Oxygen gas as the combustion-supporting gas and hydrogen gas as the combustible gas are fed through the multi-nozzle section and the central multi-fold tube section of the burner. In the process, oxygen in excess of the stoichiometry is available in at least one of the multi-nozzle section and the central multi-fold tube section, preferably in both the multi-nozzle section and the central multi-fold tube section of the burner. If hydrogen in excess of the stoichiometry is available in both the multi-nozzle section and the central multi-fold tube section, then the distribution of absorption edge wavelength at an apparent transmittance per 5-mm thickness may exceed 10 nm. Preferably the flow rates of oxygen and hydrogen are adjusted so as to provide a $H_2/O_2$ ratio <2, more preferably $H_2/O_2$ ratio ≤1.9, and even more preferably $H_2/O_2$ ratio ≤1.8. The lower limit of $H_2/O_2$ ratio is 1.5. In case $H_2/O_2$ ratio <1.5, the process may fail to maintain an appropriate ingot growth face temperature and tend to produce a temperature distribution across the ingot growth face, interfering with the use as the EUV lithography member.

In another preferred embodiment, hydrogen gas as the combustible gas is injected through the burner at a linear velocity of less than or equal to 100 m/sec, more preferably less than or equal to 90 m/sec. If the linear velocity of hydrogen gas injected as the combustible gas through the burner is higher than 100 m/sec, the titania-doped quartz glass prepared under such conditions tends to experience a substantial reduction of the OH group concentration upon 900° C./100-hr heat treatment and a lowering of apparent transmittance per 5-mm thickness at 350 to 800 nm, and have a substantial distribution of absorption edge wavelength, which lead to the risk of thermal hysteresis on use as the EUV lithography member. In some cases, a titania-doped quartz glass ingot prepared under such conditions may contain fine grains of titania, which interfere with the use as the EUV lithography member. The lower limit of the linear velocity of hydrogen gas is usually at least 40 m/sec, and preferably at least 60 m/sec. If the linear velocity of hydrogen gas is lower than 40 m/sec, such a lower linear velocity, though effective for minimizing the reduction of OH group concentration upon 900° C./100-hr heat treatment and setting the difference between maximum and minimum reductions of OH group concentration to or below 50 ppm, tends to produce a temperature distribution across the ingot growth face, eventually leading to a broader distribution of absorption edge wavelength, a greater fictive temperature distribution, and an OH group concentration of less than 300 ppm.

The linear velocity of reactant gas fed is preferably at least 30 m/sec, and more preferably at least 40 m/sec. If the linear velocity of reactant gas is less than 30 m/sec, then a titania-doped quartz glass ingot will grow at a lower rate, which is detrimental to productivity. On the other hand, the linear velocity of reactant gas is preferably up to 80 m/sec, and more preferably up to 70 m/sec. If the linear velocity of reactant gas is more than 80 m/sec, then the distribution of absorption edge wavelength at an apparent transmittance per 5-mm thickness may often exceed 10 nm.

The prior art knowledge about the preparation of titania-doped quartz glass has not considered the distance between the burner tip and the growth front of the ingot during the process (to be referred to as "burner distance") and the angle between the ingot growth axis and the axis of the burner's reactant feed nozzle, i.e., the nozzle axis of reactant gas-feeding central tube (to be referred to as "burner angle") as the factor of governing the physical properties of titania-doped quartz glass being prepared. It has been found that the burner distance and the burner angle must be different from those used in the preparation of undoped quartz glass, when it is desired to restrain the distribution of absorption edge wavelength at an apparent transmittance per 5-mm thickness to or below 10 nm, to set the absorption edge wavelength at an apparent transmittance per 5-mm thickness to the range of 270 to 320 nm, and to set the apparent transmittance per 5-mm thickness to or above 70% at a wavelength of 350 to 800 nm.

Referring to FIG. 1, a burner 1 is positioned relative to a target. The burner 1 and the growth front of an ingot 2 growing on the target are spaced a distance D and oriented to include an angle α therebetween. The burner distance D is preferably at least 250 mm, more preferably at least 265 mm, which distance is at least 1.2 times longer than the distance used in the preparation of undoped quartz glass. This is because reactions of reactant gases takes a sufficiently long time to restrain generation of structural defects, as compared with the preparation of undoped quartz glass. The burner distance D is typically up to 350 mm. A burner distance D of more than 350 mm makes it difficult to maintain an optimum temperature for ingot growth.

In a preferred embodiment, the burner angle α is at least 126°, and more preferably at least 128°. While a burner angle of less than or equal to 125° is generally employed in the preparation of undoped quartz glass, the embodiment of the invention recommends growth at a greater burner angle. Maintaining a burner angle α of at least 126° ensures the uniformity of growth face temperature, making it possible to prepare a titania-doped quartz glass with a minimized distribution of absorption edge wavelength and a reduced distribution of fictive temperature. The burner angle α is typically up to 140° in view of the productivity of titania-doped quartz glass.

The titania-doped quartz glass ingot 2 is formed by subjecting the reactant gases to oxidation or flame hydrolysis to form synthetic silica-titania fine particles, depositing the particles on a target, and concurrently melting and vitrifying the deposited particles. In order that the growth of ingot 2 as a result of concurrent deposition, melting and vitrification always occur at a front P in FIG. 1, the target together with the ingot growing thereon is rotated about its axis and retracted at a predetermined rate, that is, moved away from front P to the right as viewed in FIG. 1. The retraction may be continuous or intermittent. The retraction rate is determined such that deposition, melting and vitrification may occur at front P. This setting ensures that the burner distance D and burner angle α are kept constant.

The silicon-providing reactant gas used herein may be selected from well-known organosilicon compounds, for example, silicon tetrachloride, chlorosilanes such as dimethyldichlorosilane and methyltrichlorosilane, and alkoxysilanes such as tetramethoxysilane, tetraethoxysilane, and methyltrimethoxysilane.

The titanium-providing reactant gas used herein may also be selected from well-known compounds, for example, titanium halides such as titanium tetrachloride and titanium tetrabromide, and titanium alkoxides such as tetraethoxytitanium, tetraisopropoxytitanium, tetra-n-propoxytitanium, tetra-n-butoxytitanium, tetra-sec-butoxytitanium, and tetra-t-butoxytitanium.

On the other hand, the combustible gas used herein may be hydrogen or hydrogen-containing gas, optionally in combination with another gas such as carbon monoxide, methane or propane. The combustion-supporting gas used herein may be oxygen or oxygen-containing gas.

In order that the titania-doped quartz glass ingot be shaped into a desired shape suited for a particular EUV lithography member such as a mirror, stage or photomask substrate, it is hot shaped at a temperature of 1,500 to 1,800° C. for 1 to 10 hours. Preferably hot shaping is preceded by heat treatment at a temperature of 700 to 1,100° C. for 12 to 100 hours. Preferably hot shaping is conducted such that the axis of the shape is parallel to the growth axis of the titania-doped quartz glass grown in the manufacture furnace. After the shaping, the titania-doped quartz glass is annealed. The annealing step is effective for mitigating any thermal strain induced in the titania-doped quartz glass by hot shaping, and reducing the fictive temperature and restraining the distribution of fictive temperature. The annealing step is also effective for lowering the hydrogen molecule concentration in titania-doped quartz glass and mitigating inclusions formed during hot shaping. Annealing may be conducted under well-known conditions, for example, by holding at a temperature of 700 to 1,300° C. in air for 1 to 200 hours. This may be followed by slow cooling, for example, at a rate of 1 to 20° C./hr from the annealing temperature to 500° C. It is preferred for restraining the distribution of fictive temperature that titania-doped quartz glass be processed to a thickness of up to 10 mm before the annealing treatment. Also preferably the thickness is at least 1 mm.

After the annealing treatment, the titania-doped quartz glass is shaped into a predetermined size by machining or slicing and then polished by a double-side lapping machine with an abrasive such as silicon oxide, aluminum oxide, molybdenum oxide, silicon carbide, diamond, cerium oxide or colloidal silica, thereby forming an EUV lithography member. From the titania-doped quartz glass, EUV lithography photomask substrates can be formed in which the difference between the highest and the lowest positions (also referred to as peak-to-valley (P-V) flatness) within a central region of 142.4 mm×142.4 mm square in the substrate surface as polished is up to 200 nm, preferably up to 100 nm. It is noted that the P-V flatness may be determined by a Fizeau interferometer (Zygo Mark IV).

EXAMPLE

Examples and Comparative Examples are given below for illustrating the invention although the invention is not limited thereto.

Example 1

A titania-doped quartz glass ingot was prepared by using a furnace including a burner as shown in FIG. 2, feeding gases ($SiCl_4$, $TiCl_4$, $O_2$, $H_2$) to respective nozzles of the burner as shown in Table 1, forming an oxyhydrogen flame, effecting oxidation or flame hydrolysis of silicon tetrachloride and titanium tetrachloride in the oxyhydrogen flame to produce $SiO_2$ and $TiO_2$, depositing silica and titania fine particles on a target, and concurrently melting and vitrifying the particles. The target was disposed forward of the burner, rotated at 50 rpm, and retracted at 10 mm/hr. The burner and the target were relatively set at a burner distance and a burner angle as shown in Table 1. Table 1 also reports a $H_2/O_2$ ratio and a linear velocity of hydrogen gas flows in the central multi-fold tube section and the multi-nozzle section under the process conditions. The flow rates of respective gases were kept at a variation of ±0.2% by volume. During preparation of titania-doped quartz glass in the furnace, the temperatures of inlet air to the furnace, exhaust gas from the furnace, and ambient air around the furnace were kept at a variation of ±1° C.

The resulting ingot had a diameter of 110 mm and a length of 400 mm. A disk sample of 6.5 mm thick was sliced from the ingot, ground, polished and cleaned on both the surfaces, providing a sample of 5.01 mm thick. The sample was measured for apparent transmittance at wavelength 350 to 800 nm and OH group concentration at positions radially spaced apart from the center at intervals of 20 mm. The sample was further heat treated for 100 hours in air at 900° C. and atmospheric pressure, after which a OH group concentration was measured again at radially spaced apart positions. Table 2 reports maximum and minimum reductions of OH group concentration by the 900° C./100-hr heat treatment, the difference between the maximum and minimum reductions of OH group concentration, the maximum and minimum of OH group concentration after the 900° C./100-hr heat treatment, and the lowest value of measurements of apparent transmittance at wavelength 350 to 800 nm.

The remaining titania-doped quartz glass ingot was heat treated in air at 1,000° C. for 50 hours, and hot shaped by heating at 1700° C. for 6 hours. The ingot was machined into a square column of 152.4 mm by 152.4 mm, designated titania-doped quartz glass ingot I. Substrates of 7 mm thick were sliced from ingot I. The substrates were annealed in a furnace lined with high-purity porous silicon carbide insulator by holding in air at 880° C. for 150 hours and then slowly cooling at a rate of 5° C./hr to 500° C. The substrates were polished for 6 hours by a double-side lapping machine Model 12B (Fujikoshi Machinery Corp.) using a suede-type polishing pad and cerium oxide abrasive and then for 1 hour using colloidal silica abrasive instead. Cleaning resulted in five substrates of 5.01 mm thick having both surfaces mirror polished.

Figure 3:
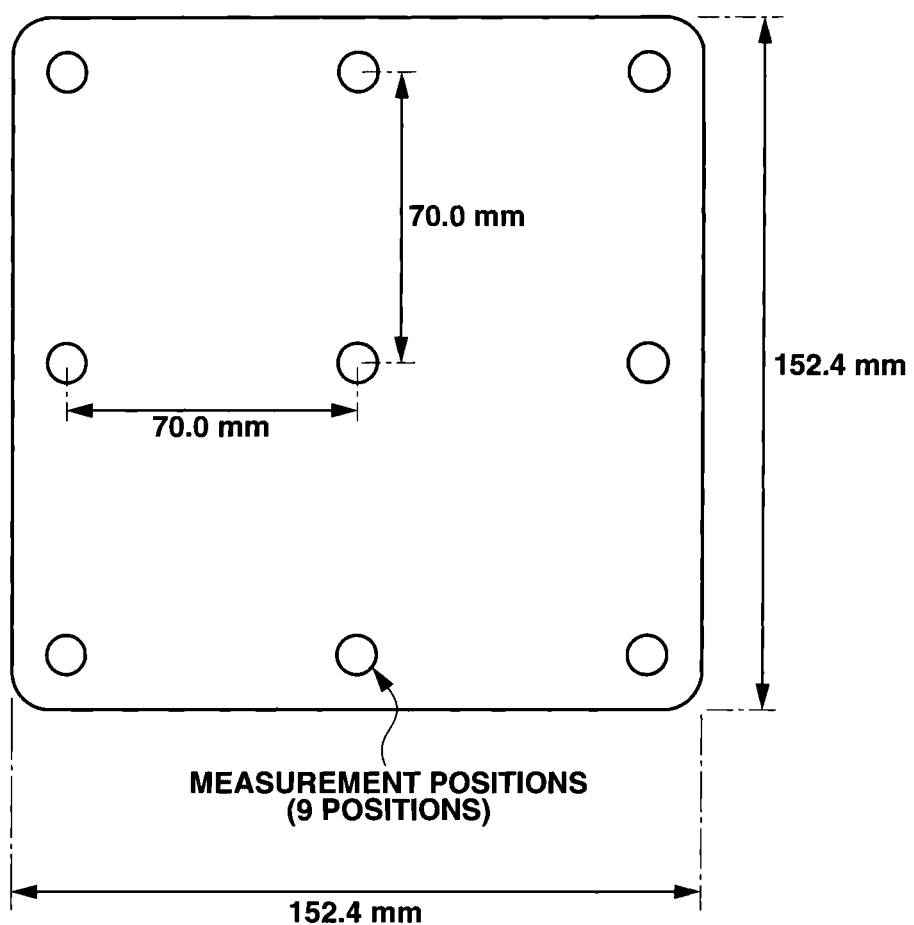
FIG. 3 is a plan view of a quartz glass sample, indicating positions at which physical properties are measured in Examples.

One substrate was measured for absorption edge wavelength at nine positions as shown in FIG. 3. Table 2 reports maximum and minimum values selected from the absorption edge wavelength measurements, and a distribution of absorption edge wavelength computed from the difference between maximum and minimum values.

Also one substrate was measured for hydrogen molecule concentration and fictive temperature at the positions shown in FIG. 3. Table 2 also reports the maximum value of hydrogen molecule concentration measurements, the maximum and minimum values of fictive temperature, and a fictive temperature distribution computed from the difference between maximum and minimum values.

Further one substrate was measured for contents of metal impurities, with a total content reported in Table 2.

One substrate was measured for $TiO_2$ concentration at the positions shown in FIG. 3 before it was analyzed for thermal expansion to determine a temperature of zero expansion. Table 2 reports the maximum and minimum values of $TiO_2$ concentration measurements and the maximum and minimum values of zero expansion temperature measurements.

Examples 2, 3, 4, 6, and Comparative Examples 1, 2

Titania-doped quartz glass ingots were prepared with the gas flow rates, burner distance and burner angle set as described in Table 1. The remaining conditions were the same as in Example 1.

Example 5

A titania-doped quartz glass ingot was prepared with the gas flow rates, burner distance and burner angle set as described in Table 1. After the ingot was shaped, it was annealed in a muffle furnace of ceramic fiber body by holding in air at 1,120° C. for 150 hours and slowly cooling at a rate of 5° C./hr to 500° C. The remaining conditions were the same as in Example 1.

The titania-doped quartz glass samples prepared in Examples 1, 2 and 3 displayed better values of absorption edge wavelength distribution, absorption edge wavelength position, apparent transmittance at 350 to 800 nm, total content of metal impurities, hydrogen molecule concentration, $TiO_2$ concentration, zero expansion temperature, fictive temperature, fictive temperature distribution, OH group concentration reduction and OH group concentration after 900° C./100-hr heat treatment. They were satisfactory as the EUV lithography member.

The titania-doped quartz glass sample prepared in Example 4 displayed a drop of apparent transmittance at 350 to 800 nm and contained more hydrogen molecules while the remaining physical property values were satisfactory.

The titania-doped quartz glass sample prepared in Example 5 contained more metal impurities while the remaining physical property values were satisfactory.

The titania-doped quartz glass sample prepared in Example 6 displayed a broad fictive temperature distribution while the remaining physical property values were satisfactory.

The titania-doped quartz glass sample prepared in Comparative Example 1 displayed unsatisfactory values of absorption edge wavelength distribution, apparent transmittance at 350 to 800 nm, hydrogen molecule concentration, OH group concentration reduction and OH group concentration after 900° C./100-hr heat treatment. The titania-doped quartz glass sample prepared in Comparative Example 2 displayed a broader fictive temperature distribution.

TABLE 1

| | | | Cross-sectional area, $mm^2$ | Gas flow rate, $Nm^3/hr$ (hydrogen gas linear velocity, m/sec) | | | | | | | |
|---|---|---|---|---|---|---|---|---|---|---|---|
| | | | | Example | | | | | | Comparative Example | |
| | | Gas | | 1 | 2 | 3 | 4 | 5 | 6 | 1 | 2 |
| Central multi-fold tube section | 1st tube | $SiCl_4$ | 10.75 | 1,420 g/hr | 1,420 g/hr | 1,420 g/hr | 1,420 g/hr | 1,420 g/hr | 1,420 g/hr | 1,420 g/hr | 1,420 g/hr |
| | | $TiCl_4$ | | 200 g/hr | 190 g/hr | 170 g/hr | 190 g/hr | 190 g/hr | 190 g/hr | 190 g/hr | 190 g/hr |
| | | $O_2$ | | 2.04 | 2.04 | 2.04 | 2.04 | 2.04 | 2.04 | 2.04 | 2.04 |
| | 2nd tube | $O_2$ | 16.68 | 0.55 | 0.55 | 0.55 | 0.55 | 0.55 | 0.55 | 0.55 | 0.55 |
| | 3rd tube | $H_2$ | 51.55 | 15.00 (80.8) | 15.00 (80.8) | 14.00 (75.4) | 19.00 (102.4) | 17.00 (91.6) | 15.00 (80.8) | 21.00 (113.2) | 20.00 (107.8) |
| | 4th tube | $O_2$ | 21.04 | 8.50 | 8.50 | 8.50 | 9.70 | 8.50 | 8.50 | 8.50 | 8.50 |
| | 5th tube | $H_2$ | 15.07 | 5.00 (92.2) | 5.20 (95.8) | 5.00 (92.2) | 5.50 (101.4) | 5.00 (92.2) | 5.00 (92.2) | 6.00 (110.6) | 6.00 (110.6) |
| | | $H_2/O_2$ ratio | | 1.80 | 1.82 | 1.71 | 1.99 | 1.98 | 1.80 | 2.43 | 2.34 |
| Multi-nozzle section | inner nozzles | $O_2$ | 100.48 | 12.00 | 12.00 | 12.00 | 12.00 | 12.00 | 12.00 | 10.00 | 10.00 |
| | inner shell | $H_2$ | 2703 | 25.00 (2.6) | 25.00 (2.6) | 25.00 (2.6) | 25.00 (2.6) | 25.00 (2.6) | 25.00 (2.6) | 25.00 (2.6) | 25.00 (2.6) |
| | outer nozzles | $O_2$ | 100.48 | 5.00 | 5.00 | 5.00 | 5.00 | 5.00 | 5.00 | 5.00 | 5.00 |
| | outer shell | $H_2$ | 1507 | 6.00 (1.1) | 6.00 (1.1) | 6.00 (1.1) | 6.00 (1.1) | 6.00 (1.1) | 6.00 (1.1) | 8.00 (1.5) | 7.00 (1.3) |
| | | $H_2/O_2$ ratio | | 1.82 | 1.82 | 1.82 | 1.82 | 1.82 | 1.82 | 2.20 | 2.13 |
| Burner distance, mm | | | | 285 | 280 | 280 | 280 | 280 | 260 | 225 | 230 |
| Burner angle, ° | | | | 128 | 128 | 130 | 128 | 128 | 124 | 124 | 122 |

TABLE 2

| | | Example | | | | | | Comparative Example | |
|---|---|---|---|---|---|---|---|---|---|
| | | 1 | 2 | 3 | 4 | 5 | 6 | 1 | 2 |
| Absorption edge wavelength position | Maximum, nm | 283 | 280 | 273 | 285 | 281 | 279 | 285 | 280 |
| | Minimum, nm | 282 | 279 | 270 | 277 | 279 | 273 | 271 | 261 |

TABLE 2-continued

|  |  | Example | | | | | | Comparative Example | |
|---|---|---|---|---|---|---|---|---|---|
|  |  | 1 | 2 | 3 | 4 | 5 | 6 | 1 | 2 |
| Absorption edge wavelength distribution, nm | | 1 | 1 | 3 | 8 | 2 | 6 | 14 | 19 |
| Apparent transmittance at 350-800 nm (minimum), % | | 92 | 92 | 92 | 52 | 82 | 86 | 62 | 64 |
| Total content of metal impurities, ppb | | 19 | 18 | 35 | 26 | 426 | 22 | 21 | 27 |
| Hydrogen molecule concentration (maximum), molecules/cm$^3$ | | not detected | not detected | not detected | $7 \times 10^{17}$ | not detected | not detected | $1 \times 10^{18}$ | $3 \times 10^{18}$ |
| TiO$_2$ concentration | Maximum, wt % | 7.5 | 6.9 | 5.9 | 6.8 | 7.0 | 6.9 | 7.0 | 6.2 |
|  | Minimum, wt % | 7.4 | 6.8 | 5.7 | 6.5 | 6.7 | 6.7 | 6.7 | 5.7 |
| Zero expansion temperature | Maximum, ° C. | 48 | 26 | 15 | 24 | 33 | 31 | 29 | 18 |
|  | Minimum, ° C. | 45 | 25 | 10 | 20 | 28 | 23 | 22 | 9 |
| Fictive temperature | Maximum, ° C. | 776 | 771 | 794 | 811 | 790 | 852 | 817 | 838 |
|  | Minimum, ° C. | 774 | 768 | 790 | 800 | 782 | 818 | 801 | 802 |
| Fictive temperature distribution, ° C. | | 2 | 3 | 4 | 11 | 8 | 34 | 16 | 36 |
| OH group concentration reduction | Maximum, ppm | <2 | <2 | <2 | 121 | <2 | 89 | 77 | 64 |
|  | Minimum, ppm | <2 | <2 | <2 | 59 | <2 | 39 | 9 | 6 |
|  | Max − Min, ppm | <2 | <2 | <2 | 62 | <2 | 50 | 68 | 58 |
| OH group concentration | Maximum, ppm | 598 | 612 | 618 | 586 | 634 | 685 | 713 | 697 |
|  | Minimum, ppm | 540 | 593 | 604 | 540 | 608 | 621 | 684 | 622 |

Japanese Patent Application No. 2010-196557 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a titania-doped quartz glass, comprising:
    feeding a silicon-providing reactant gas and a titanium-providing reactant gas through a burner tip along with a combustible gas in the form of hydrogen gas at a linear velocity of up to 100 m/sec and a combustion-supporting gas;
    subjecting the reactant gases to oxidation or flame hydrolysis to form synthetic silica-titania fine particles under an oxyhydrogen flame;
    depositing the silica-titania fine particles on a rotating target;
    concurrently with the depositing, melting and vitrifying the deposited particles to grow an ingot of titania-doped quartz glass; and
    retracting the target at such a rate that the distance between the burner tip and a growth front of the ingot is at least 250 mm;
    wherein the ingot has a growth axis, the burner includes a central tube for feeding the reactant gases having a nozzle axis, and the burner is oriented relative to the target such that the angle included between the growth axis and the nozzle axis is 126 degrees to 140 degrees.

2. The method of claim 1 wherein the ingot has a growth axis, the burner includes a central tube for feeding the reactant gases having a nozzle axis, and the burner is oriented relative to the target such that the angle included between the growth axis and the nozzle axis is at least 126 degrees.

3. The method of claim 1 wherein the burner comprises a central multi-fold tube section including a central tube for feeding the reactant gases, and a multi-nozzle section enclosing the central multi-fold tube section, and oxygen gas as the combustion-supporting gas and hydrogen gas as the combustible gas are fed through the burner such that oxygen in excess of the stoichiometry is available in at least one of the multi-nozzle section and the central multi-fold tube section.

4. The method of claim 1, wherein the feeding step includes injecting hydrogen gas as the combustible gas through the burner at a linear velocity of up to 100 m/sec and injecting the reactant gases at a linear velocity of at least 30 m/sec.

5. The method of claim 1, wherein the step of feeding the silicon-providing reactant gas, titanium-providing reactant gas, combustible gas, and combustion-supporting gas includes controlling the flow rate of each gas within a variation of ±1% by volume.

6. The method of claim 1 wherein the target is rotated at a rotational speed of 5 to 200 rpm.

7. The method of claim 1 wherein the combustible gas is hydrogen gas and the combustion-supporting gas is oxygen gas, and H$_2$/O$_2$ ratio is in the range of from 1.5 to less than 2.

8. The method of claim 1 wherein the linear velocity of reactant gas is 30 to 80 m/sec.

9. The method of claim 1 wherein the linear velocity of hydrogen gas is at least 40 m/sec.

10. The method of claim 1 wherein the distance between the burner tip and the growth front of the ingot is up to 350 mm.

* * * * *